C. W. FISCHER.
INSECT TRAP.
APPLICATION FILED APR. 7, 1911.
1,008,250.
Patented Nov. 7, 1911.
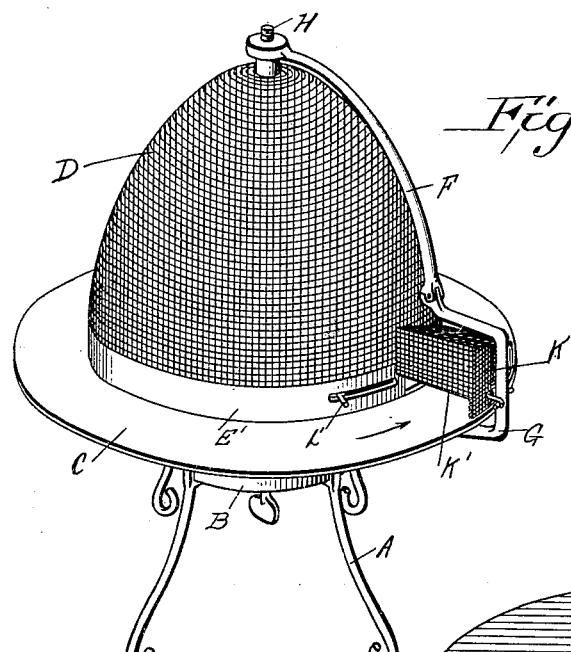
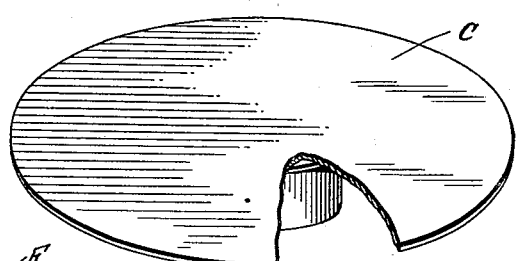
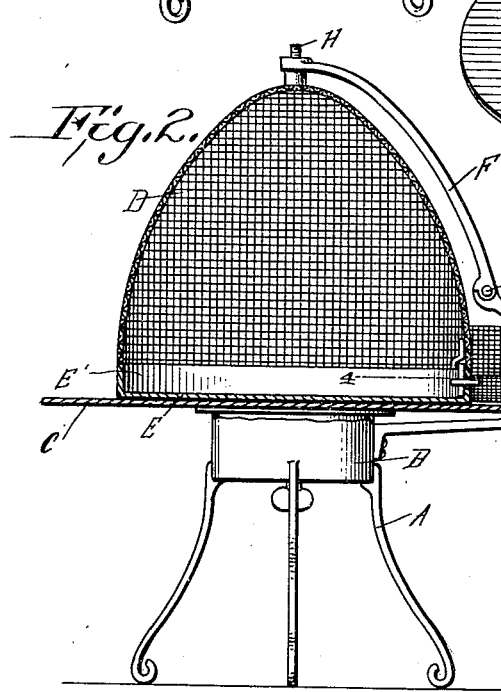
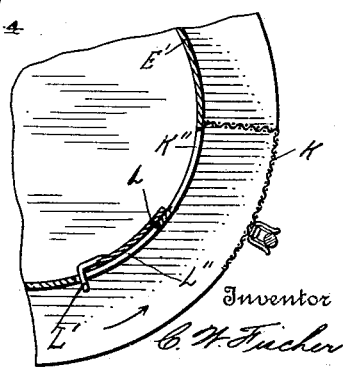
Witnesses
Inventor
C. W. Fischer
By
Attorneys
COLUMBIA PLANOGRAPH CO., WASHINGTON, D. C.

UNITED STATES PATENT OFFICE.

CHARLES W. FISCHER, OF SPARKS, NEBRASKA.

INSECT-TRAP.

1,008,250. Specification of Letters Patent. Patented Nov. 7, 1911.

Application filed April 7, 1911. Serial No. 619,566.

*To all whom it may concern:*

Be it known that I, CHARLES W. FISCHER, a citizen of the United States, residing at Sparks, in the county of Cherry and State of Nebraska, have invented certain new and useful Improvements in Insect-Traps, of which the following is a specification.

The present invention involves an improved trap particularly designed for catching flies and similar insects, and of the type utilizing a rotatable base or platform on which the insects are likely to alight, and which is moved very slowly to carry the insects beneath a cage extension, by which they are entrapped.

The invention involves particularly the special mounting of the parts affording a convenient and advantageous arrangement, permitting of ready removal of the cage in order to destroy the entrapped insects, and affording other advantages that will appear more fully as this description proceeds.

For a full understanding of the present invention reference is to be had to the following description and to the accompanying drawings in which—

Figure 1 is a perspective view of a trap embodying the invention; Fig. 2 is a vertical sectional view, the stand of the trap being shown in elevation; Fig. 3 is a perspective view of the rotatable base plate; Fig. 4 is a fragmentary sectional view on the line 4—4 of Fig. 2.

Throughout the following detail description and on the several figures of the drawings, similar parts are referred to by like reference characters.

In the drawings, A designates a stand comprising suitable legs, at the upper portion of which is supported a casing B designed to house a spring which is operatively connected with a suitable base plate C arranged above the casing B and adapted to be rotated very slowly by means of the spring referred to above. The base plate C constitutes a platform, the outer portion of which extends some distance beyond a cage D mounted above the platform and provided with a suitable bottom E, spaced from the part C slightly so as not to interfere with the free rotation of the latter.

The cage D is made preferably of foraminous material such as screen, and is carried by the upper end F of a laterally extending arm G projecting from the casing B. The upper end F of the arm G is provided with a threaded opening adapted to receive the threaded stem H projecting from the top of the cage D and supporting the cage in operative position by reason of its connection with the part F. The cage D is provided with an entrance or extension K having an opening K' at one side thereof, said entrance or extension K projecting radially from the body of the trap, being arranged so that the exposed platform or plate C passes beneath the part K as the platform rotates. The bottom portion E of the cage D is flanged at E' and is cut away at the side adjacent to the extension K of the cage to form an opening through which the flies or insects pass from the extension K into the body of the cage D.

A sliding door L operable by a finger piece L' passing through a slot L'' in the flange E' is adapted to be moved so as to close the auxiliary entrance opening K'' in the flange E'.

From the foregoing it will be observed that, in the use of the trap above described, sugar, or similar bait, may be placed on the outer exposed portion of the platform C and flies will be attracted thereto. As the flies remain on the platform C, eating the bait, they are carried very slowly beneath the entrance extension K of the cage D and the side of the part K opposite the entrance K' is so close to the surface of the platform C that the flies will be wiped or pushed as soon as they strike the part K, and being startled, they will pass into the cage through the auxiliary entrance K''.

It is desirable, in order to prevent accidental movement of the cage D supported by the upper end F of the arm G, to apply a small pivoted catch M to the outer portion of the extension K, said catch being composed of spaced members movable to receive therebetween a vertical portion of the arm G and thus prevent unscrewing movement of the stem H with respect to the part F. Also, to facilitate removal of the cage D for the purpose of killing insects entrapped therein, after the door L has been closed, the upper end F of the arm G is preferably provided with a movable section pivoted at F' so that the cage may be moved bodily so as to raise the same and permit of readily unscrewing it from its connection with the part F.

Having thus described the invention, what is claimed as new is:

In an insect trap, the combination of a rotatable platform, a cage above said platform, an arm projecting over the platform, a stem on the cage having detachable threaded connection with said arm, the cage being provided with an entrance adapted to receive insects alighting on the platform, and a catch projecting from the cage into engagement with the arm to prevent accidental detachment of the cage from the arm.

In testimony whereof I affix my signature in presence of two witnesses.

CHARLES W. FISCHER.

Witnesses:
JOHN HUNGENBERG,
ASAHEL P. SMITH.

Copies of this patent may be obtained for five cents each, by addressing the "Commissioner of Patents, Washington, D. C."